April 4, 1961 R. W. KETCHLEDGE 2,978,577

NOISE REDUCING SYSTEMS

Filed March 4, 1948

3 Sheets-Sheet 1

INVENTOR
R. W. KETCHLEDGE
BY B. C. Geger
ATTORNEY

April 4, 1961 | R. W. KETCHLEDGE | 2,978,577

Filed March 4, 1948 | NOISE REDUCING SYSTEMS

3 Sheets-Sheet 2

INVENTOR
R. W. KETCHLEDGE
BY B. C. Seger
ATTORNEY

April 4, 1961 R. W. KETCHLEDGE 2,978,577

NOISE REDUCING SYSTEMS

Filed March 4, 1948 3 Sheets-Sheet 3

INVENTOR
R. W. KETCHLEDGE
BY B. E. Leger
ATTORNEY

United States Patent Office 2,978,577

Patented Apr. 4, 1961

2,978,577

NOISE REDUCING SYSTEMS

Raymond W. Ketchledge, Jamaica, N.Y., assignor to Bell Telephone Laboratories, Incorporated, a corporation of New York Filed Mar. 4, 1948, Ser. No. 13,016

7 Claims. (Cl. 250—20)

This invention relates to a system for and methods of reducing the interfering noises present in a sound wave or electromagnetic wave receiving system.

In order to reduce noise effects in radio, radar or sonar receiving systems, it is necessary to distinguish by some means between the noise voltage and the signal, or combined signal and noise voltage. A well-known method of producing this separation is to discriminate between the noise and signal on the basis of amplitude and by this means noise pulses which exceed the maximum signal amplitude may be reduced. Noise silencer circuits of this type are in general use. However, this method requires that the received signal amplitude be known. In many cases, especially when the signal is in the form of widely spaced pulses, the signal amplitude is unknown and this amplitude discrimination method is inadequate.

This invention is based on the fact that the frequency distributions of the signal and interfering noises are quite different and a separation of noise and signal may be made on this basis. This method functions by canceling the noise in the signal frequency band against noise derived by a similar adjacent frequency band. The separation of the center frequencies requires that the cancellation be made between the envelopes of the responses in the two bands.

It is well known that the interfering noise in receiving systems may be generally classified into two types, random noise and impulse noise. Impulse noise is generally composed of separated bursts of received energy having relatively high amplitude compared to other noises, but having very short durations. These sudden noise impulses produce in a tuned receiving system a voltage response that is proportional to the band width of the receiving system and to a large extent independent of the location of this band in the spectrum. Thus a receiving system responsive to a certain band of frequencies will have a peak voltage response proportional to the band width and independent of the center frequency. Also, the response duration is inversely proportional to this band width, so that the power response is proportional to the band width in agreement with the flat frequency distribution of the components of the original impulse of noise.

Therefore, two or more frequency bands of identical shape and width will have identical envelope responses to pure impulse noise even when their center frequencies are not the same. As will be described, this invention utilizes this principle to reduce or remove impulse noise in the output of a receiving system.

Random noise may be considered as the superposition of many impulses occurring at random times. The random occurrence destroys the phase coherence between components of different frequencies because the components of different impulses add vectorially and lose their phase identity. Therefore, random noise, while losing the correlation between responses produced in differently centered frequency bands, retains the flat frequency distribution of impulse noise as well as the power response proportional to band width. As a further consequence of the random phase characteristic of random noise, the voltage response is proportional to the square root of band width. Therefore, two or more frequency bands of identical shape and width but different center frequencies will have unrelated envelope responses when excited by random noise. Thus, the principle of this invention does not apply to totally random noise of constant average amplitude.

However, a form of noise not adequately covered by the two categories above is noise, essentially random in character but of fluctuating amplitude, such as thermal noise passed through an amplifier of fluctuating gain. In this case the average amplitude in any particular band is proportional to the gain of the amplifier, although at any instant the actual noise amplitude may be far from its average value. Nevertheless it can be seen that there will be a definite correlation between the envelope responses of differently centered frequency bands because of the common modulation. Therefore, the principle of this invention functions to a reasonable extent on modulated random noise.

Due to such differences as exist between the envelope responses in separated frequency bands excited by the same bursts of noise, the noise signals are not exactly the same. These differences may be due to differences in the transmission medium or in the receiving circuits, as well as to characteristics of the noise itself. This effect appears to have limited prior attempts to obtain noise reduction in this manner. Systems of this type have been disclosed in Patent 1,309,538, July 8, 1919, to J. Mills and J. R. Carson, Vreeland Patent 1,692,877, July 12, 1921, and Espenschied Patent 1,223,376, April 24, 1917.

In accordance with a feature of the present invention, by balancing the noise envelope derived from a band not including the signal frequency against the noise envelope of the signal frequency band and then passing the combined signal and residual noise through a filter to remove very high frequency and, in some cases, very low frequency components, the degree of noise balance obtainable is materially improved.

An object of this invention is to reduce or remove from the output of wave energy receiving systems those types of interfering noise susceptible to removal by envelope cancellation.

It is a further object to improve underwater sound echo-ranging systems by the reduction or removal of the masking effects of propeller noise or other water noises.

It is an object of this invention to improve the accuracy of bearing and bearing deviation indicators in the presence of propeller noise.

A further object is to improve the audible presentation of echoes in sonic echo-ranging systems.

The above and further objects, features and advantages of the invention will become more apparent from the following detailed description taken with reference to the accompanying drawings, wherein.

Similar reference characters have been used to denote similar elements throughout the drawings.

As will be understood, the invention is applicable to the reduction of noise and while it is described in connection with underwater sound echo-ranging systems for the reduction of the effects of propeller noise, it is understood that the invention may be equally employed for noise reduction in other types of wave receiving systems such as radio and radar.

Figure 1:
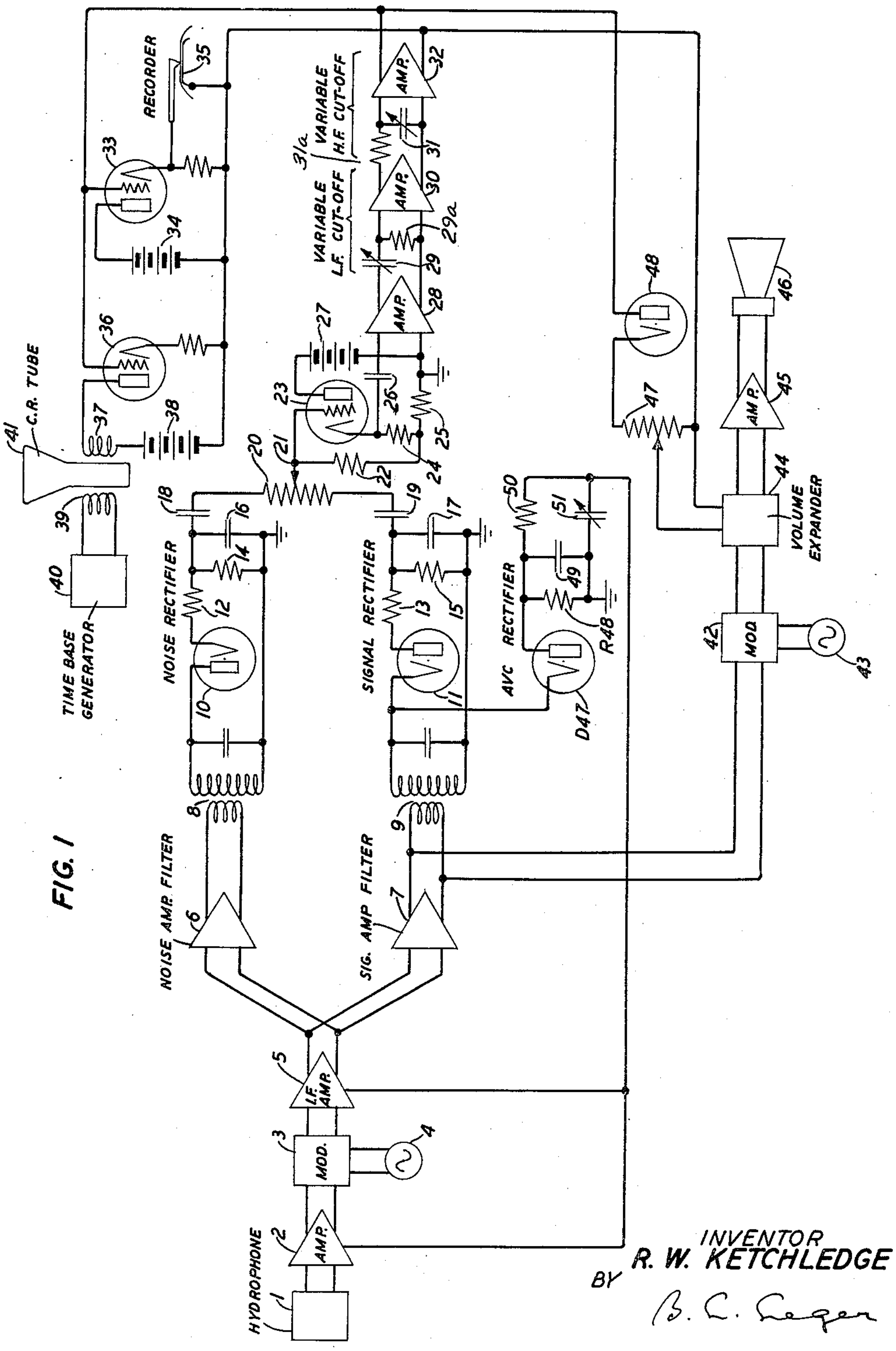
Fig. 1 is a diagram of a sound wave translating system in accordance with the invention, suitable for use in echo detecting and echo ranging, for example, and including noise balancing and volume expanding circuits for discriminating against noise.

Referring to Fig. 1 of the drawings, wherein is shown an embodiment of the invention for the reduction of propeller noise effects in a sonar system, there is shown the receiving portion of such a system. Hydrophone 1 receives sound wave pulses reflected from a target, not shown, and develops a corresponding voltage which is delivered to amplifier 2. Hydrophone 1 is preferably of the crystal type having a broad band frequency response. Amplifier 2 is also equally responsive over a wide band of frequencies including both noise and signals. Modulator 3 driven by oscillator 4 is of conventional design and the combination converts the received sound wave frequencies to an intermediate frequency. The intermediate frequency amplifier 5 amplifies a broad band of frequencies including both of the bands amplified further by amplifier-filters 6 and 7. The oscillator 4 is adjusted in frequency to cause the amplified and translated sound wave signal to fall in the band of frequencies passed by signal amplifier-filter 7, while the band of frequencies amplified and passed by noise amplifier-filter 6 is located in an adjacent portion of the spectrum so that no signal components of appreciable magnitude are passed by the noise amplifier-filter 6 and the output of this element consists principally of noise taken from said adjacent portion of the spectrum.

In a particular case the sound wave received was a short duration pulse of a 25-kilocycle wave. The hydrophone 1 was responsive over the range of 20 to 30 kilocycles. The amplifier 2 amplified this range of 20 to 30 kilocycles uniformly. Oscillator 4 operated at 75 kilocycles to cause modulator 3 to translate the 25-kilocycle signal pulse to 100 kilocycles. The broad intermediate frequency amplifier 5 amplified the band from 95 to 105 kilocycles uniformly while the signal amplifier-filter 7 passed only 99 to 101 kilocycles and noise amplifier-filter 6 passed only the band 102 to 104 kilocycles. Therefore, the output of noise amplifier-filter 6 consists of amplified noise waves picked up from the water sounds in the frequency range of 27 to 29 kilocycles, while the output of signal amplifier-filter 7 consists of amplified signal and noise waves in the range of 24 to 26 kilocycles. The shape and width of the response characteristics of the amplifier-filters 6 and 7 are adjusted to be substantially identical aside from the displacement of the center frequency. This causes the envelope responses to impulse noise disturbances to be very nearly identical at the output of amplifiers 6 and 7.

These outputs are then passed respectively to coupling transformers 8 and 9, which actuate oppositely poled, like diode rectifiers 10 and 11, which in turn supply appropriately rectified waves to filtering circuits consisting of resistors 12 and 14 and condenser 16 for the noise channel, and resistors 13 and 15 and condenser 17 for the signal channel. The corresponding resistors 12 and 13, 14 and 15, and condensers 16 and 17 are made identical.

The waves at these two points supplied to condensers 18 and 19 consist of the envelopes of the signals and/or noises derived from the appropriate portions of the sound spectrum. Thus the apparatus thus far described functions to obtain the envelope response of a band centered on the desired signal frequency containing signal and noise and to obtain separately the envelope response to a band in an adjacent portion of the spectrum in which noise alone appears.

Condensers 18 and 19 have equal capacities and have negligible reactance at all useful envelope frequencies. Their function is to prevent direct current interaction between rectifiers 10 and 11. Potentiometer 20 combines the noise and signal envelopes and by adjustment of slider 21 of potentiometer 20 the noise envelopes of the two channels may to a large extent be cancelled against each other. This occurs because rectifiers 10 and 11 are poled in opposite sense so that a burst of noise received by hydrophone 2 will produce a positive pulse across resistor 14 while resistor 15 will have a negative pulse produced across it of comparable magnitude and duration. These two pulses are combined on potentiometer 20 and slider 21 is adjusted until the best cancellation is obtained. However, useful signals actuate rectifier 11 only and not rectifier 10, so that the useful signal does not suffer cancellation.

Amplifier tube 23 energized by battery 27 is provided with a grid leak 22 which is returned to the junction of resistors 24 and 25. Resistor 24 is chosen for suitable biasing of tube 23, while resistor 25 is made relatively large in value, causing tube 23 to operate as a cathode follower and materially reducing the loading effect of resistor 22 upon potentiometer 20. This allows potentiometer 20 to have a much higher resistance than is otherwise possible and greatly reduces undesirable interaction between rectifiers 10 and 11.

Condenser 26 has low reactance at all envelope frequencies and blocks direct current from the input of amplifier 28. Amplifier 28 is responsive to all envelope frequencies and in this case is an audio frequency amplifier. The desired signal at the output of amplifier 28 is a direct current pulse which is normally of 100 milliseconds' duration or less. Thus very low frequencies are not essential to reproduce this pulse, so it is possible to insert between amplifiers 28 and 30 a high-pass filter to discriminate against noise components of very low frequency without material effect upon the desired signal. A simple high-pass filter structure is shown comprising a condenser 29 as a series arm followed by a resistor 29a as a shunt arm. Condenser 29 is adjusted for best reception of the particular signal pulse length used. Likewise the envelope output of amplifier 28 contains many high frequency noise and/or signal components not essential to the satisfactory reproduction of the signal. Some of these high frequency components are due to imperfect cancellation of impulse noise between the outputs of rectifiers 10 and 11. Others are due to the fact that the intermediate frequency responses are intentionally broader than required for reproduction of the signal. This is necessary to allow for doppler shift in the signal received from a moving target and for other reasons. Also, the use of wide intermediate frequency bands plus a relatively narrow envelope response band materially improves the degree of noise balancing obtainable in practice. Therefore between amplifiers 30 and 32 a low-pass filter cutting off high frequencies is inserted. A simple low-pass filter structure is shown in which the cut-off is adjustable by means of condenser 31, this filter comprising resistance 31a and condenser 31. The use of envelope filtering materially improves the signal-to-noise ratio and the degree of noise balance obtainable. Thus the output of amplifier 32 consists of the desired signal pulse with some residual noise. This pulse is fed to tube 33 energized by battery 34 for actuating a chart recorder 35 of conventional design. The signal from amplifier 32 is also fed to tube 36 energized by battery 38 which supplies current through a deflection coil of cathode-ray tube 41. A linear time base generator 40 also actuates a deflection coil 39 of the cathode-ray tube 41 to produce a plot on the screen of the tube 41 of the received pulse signals versus time in the conventional manner, this plot indicating the range (i.e., the distance) of the target.

This sonar receiving system is also provided with a novel listening circuit for aurally indicating reception of signals echoed from a target. The output of signal amplifier filter 7 which consists of a 100-kilocycle signal pulse plus associated noise is fed to modulator 42 driven by oscillator 43 operating, say, at 101 kilocycles. Thus the output of modulator 42 contains a 1,000-cycles per second pulse when a signal sound wave pulse is received. In accordance with the invention, this 1,000-cycles per second signal is passed through a volume expander 44, and the expanded signal, which may be amplified by audio frequency amplifier 45, actuates loudspeaker 46. The volume expander 44 may be, for example, of the type shown as the master mixer on page 212 of the RCA Receiving Tube Manual, copyright 1940 by RCA Manufacturing Company, Incorporated. The output of amplifier 32 is arranged to be a positive direct current pulse and is supplied to potentiometer 47 through diode rectifier 48. This diode rectifier 48 is poled so that only positive pulses are passed. Thus the voltage across potentiometer 47 is in the form of unidirectional signal pulses; and negative noise pulses or other negative pulses due, for example, to overshoot from signal pulses produced by the low cut-off filter between amplifiers 28 and 30 are not passed by rectifier 48. The positive output of potentiometer 47 drives the volume expander 44 to increase the audio gain or volume during the reception of a signal pulse. The blocking of negative pulses by rectifier 48 prevents any decrease in volume or audio gain due to noise or overshoot as explained above. Thus the volume expander can only increase the audio gain or volume (as compared to the value that would obtain if the output circuit of amplifier 32 were opened), and will do so only in the presence of signal. Thus echoes may be made to stand out of the background of noise from the loudspeaker by the control of the audio gain by the envelope signal in which a noise balance has been made. In practice, the signal-to-noise ratio at the output of amplifier 32 is materially better than that of the usual audio listening circuit, so this combination represents a means for introducing the improved signal-to-noise ratio at the output of amplifier 32 into the audio listening circuit. It is of value even in the absence of adjacent band noise balancing as is obtained, for example, by disabling noise amplifier filter 6.

Also shown is an automatic volume control or automatic gain control rectifier D47 with load resistor R48 and by-pass condenser 49 to develop a gain control voltage from the received signals. The low-pass filter arrangement consisting of resistor 50 and adjustable condenser 51 permit adjusting the speed of operation of the gain control to prevent distortion of the signal pulses. The control is applied only to amplifiers 2 and 5 which are common to the noise and signal channels. This permits the noise and signal channels to remain in balance at potentiometer 20 in spite of gain variations by the automatic volume control circuit.

Figure 2:
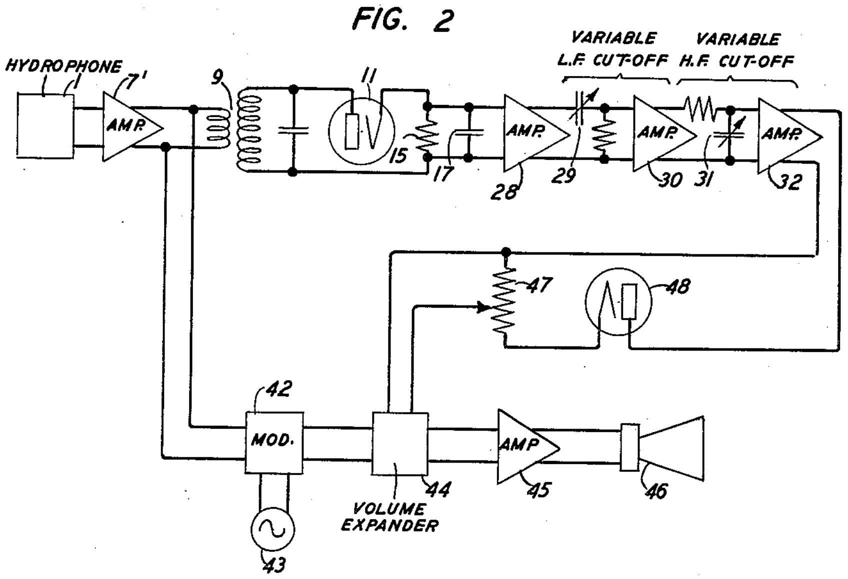
Fig. 2 shows a diagram of an audio listening circuit in accordance with the invention, including a volume expander in which the audio volume is controlled by the strength of the echoes in an echo-ranging system.

Fig. 2 is a drawing of a listening circuit which is a simplified form of that of Fig. 1, without the noise balancing feature. The hydrophone 1 picks up sound signals which are fed in the form of corresponding voltages to amplifier 7′ which amplifies a band of frequencies centered on the desired signal frequency, for example 25 kilocycles. Amplifier 7′ may alternatively consist of the amplifying and translating means shown on Fig. 1 with the noise amplifier filter 6 disabled. The output of amplifier 7′ is passed through coupling transformer 9 and rectified by diode 11, and the envelope signal is developed across load resistor 15 and by-pass condenser 17. The envelope signal is amplified by amplifiers 28, 30 and 32 with corresponding low and high frequency cut-off filters adjusted by condensers 29 and 31 respectively. Rectifier 48 passes only the desired polarity of pulse to potentiometer 47 so that the volume expander 44 increases the gain of the audio listening circuit above its normal or no-signal value (with consequent increase of the volume of sound from loudspeaker 46) when a useful signal is received, and gain decreases below normal are prevented. Modulator 42 driven by oscillator 43 operating in this circuit at 26 kilocycles, for example, and amplifier 45 driving loudspeaker 46, are conventional and have already been explained. This arrangement causes the weaker echoes in a sonar system to stand out better from the general background of noise and reverberation and it is therefore possible to detect weaker echoes than otherwise possible.

Figures 3, 3A:
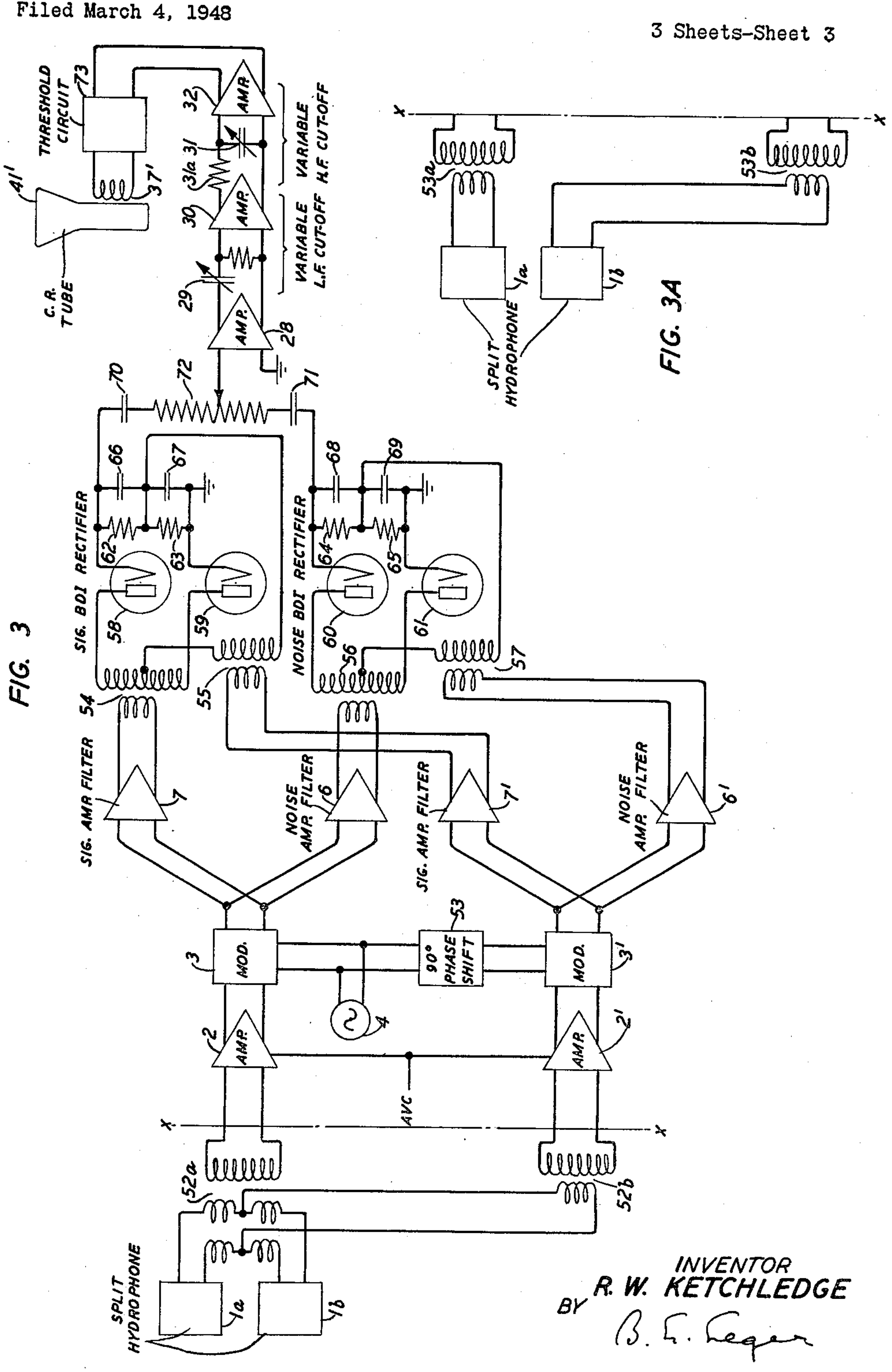
Fig. 3 is a diagram of a bearing deviation indicating system embodying a form of the invention, suitable for reception of echoes in an echo-ranging system and incorporating noise balancing circuits.
Fig. 3A shows a modification of Fig. 3 for an alternative hydrophone arrangement.

Fig. 3 shows one way in which, in accordance with the invention, noise-reducing circuits may be incorporated in a bearing deviation indicator of otherwise conventional design. The arrangement of Fig. 3 is distinguished by the addition of a phase-sensitive rectifier designated the noise BDI rectifier, which preferably is substantially a duplicate of the conventional bearing deviation indicator's conjugate input phase-sensitive detector designated the signal BDI rectifier. The noise BDI rectifier is actuated by adjacent band noise and its output is cancelled against the conventional indicator's output to effect a noise reduction. The detailed operation will be apparent from the figure and the following description. The hydrophone 1*a*, 1*b* is split electrically into, say, a right and left half. The signals from the two halves are combined in hybrid coil 52*a* in such a way that the output winding delivers to amplifier 2 a signal which is the sum of the two signals from the hydrophone halves 1*a* and 1*b* whereas the transformer 52*b* delivers to amplifier 2′ a signal which is the difference between the signals from the hydrophone halves 1*a* and 1*b*. Amplifiers 2 and 2′ are broadly responsive as in Fig. 1. The outputs of amplifiers 2 and 2′ are passed through modulators 3 and 3′ driven by oscillator 4 to obtain a translation to the desired intermediate frequency which is amplified by amplifier-filters 6, 7, 6′ and 7′. These amplifier-filters are the exact counterparts of the corresponding elements in Fig. 1. Phase shifter 53 is used to effect a 90-degree phase difference between the sum and difference signals. In accordance with the invention, as before, automatic volume or gain control voltages are applied to the common amplifiers 2 and 2′ rather than after the noise and signal channels have been separated. In this system these gain control voltages may be derived by an AVC rectifier circuit (not shown), such as that of Fig. 1, fed from amplifier 7 or 7′, for example. The coupling transformers 54, 55, 56 and 57 connect the outputs of the respective amplifier-filters 7, 6, 7′ and 6′ to their respective phase sensitive bearing deviation indicator rectifier circuits consisting, for the signal channel, of diodes 58 and 59 with load resistors 62 and 63 and by-pass condensers 66 and 67, and for the noise channel, of diodes 60 and 61 with load resistors 64 and 65 and by-pass condensers 68 and 69. Thus condensers 70 and 71 whose reactances are negligible pass, respectively, the bearing deviation indicator rectifier output of the signal channel and the bearing deviation indicator rectifier output of the noise channel. In Fig. 3A is shown an alternative connection of the hydrophone halves 1*a* and 1*b*, the connection in this case being to transformers 53*a* and 53*b*. This is another well-known connection and will function equally well for noise reduction by adjacent channel balancing in accordance with the invention. The circuit of Fig. 3A can replace the portion of the circuit of Fig. 3 to the left of line X—X in Fig. 3.

The bearing deviation indicator signals passed by condensers 70 and 71 are combined on potentiometer 72 whose slider is adjusted to provide the best cancellation of the undesired noise signals from the output of the signal bearing deviation indicator rectifier against the noise-alone output of the noise bearing deviation indicator rectifier. The amplifiers 28, 30 and 32 are coupled by means of low cut-off and high cut-off filters whose cut-offs may be adjusted respectively by means of variable condensers 29 and 31. By suitable adjustment of these cut-offs it is possible to materially improve the degree of balance obtainable by adjustment of the slider of potentiometer 72 as well as reduce those types of noise not subject to balancing. The output of amplifier 32 therefore contains the desired signal pulse, with some residual noise. The signal pulse is then passed through threshold circuit 73 before being applied to deflection coil 37′ of cathode-ray tube 41′. The action of threshold circuit 73 is to block voltages smaller than a desired value and to pass only those voltages greater than the desired value.

In a bearing deviation indicator the desired signal pulse may be of either polarity and consequently the threshold circuit must act on the magnitude of the signal voltage and not be influenced by its polarity. The location of the threshold circuit after the use of envelope selectivity represented by the filters coupling amplifiers 28, 30 and 32 is believed new and yields a major improvement in the reliability of the bearing indications obtained. It has been common in the past to use threshold biasing in the bearing deviation indicator rectifier, for example by inserting batteries in series with the diodes 58 and 59 in such a way as to prevent their conduction on weak signals and noises. However, this permits all frequency components delivered by the signal intermediate frequency amplifiers 7 and 7′ to add together to break through the threshold. Here, by introducing envelope selectivity before applying the threshold, the only noise components that can act to break through the threshold are those which must be passed to prevent distortion of the desired signal. Thus the use of envelope selectivity ahead of the threshold circuit permits the threshold point to be lowered without producing false noise indications and thereby permits reliable bearing deviation indication on weaker signals than otherwise possible. Further the noise balance obtained by use of the adjacent channel noise balancing circuit improves the reliability.

Figure 4:
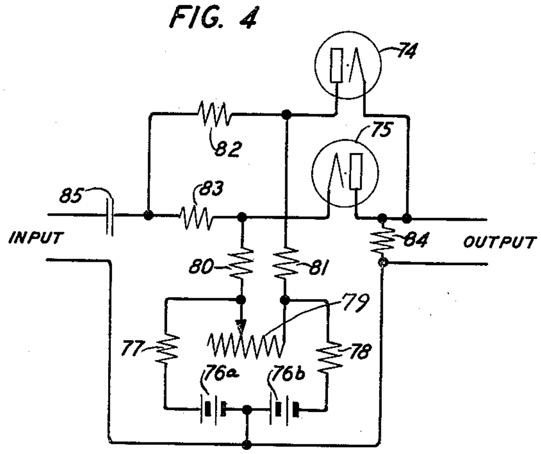
Fig. 4 shows a threshold circuit which may be utilized in the circuit of Fig. 3.

A suitable threshold circuit for use at 73 is shown as Fig. 4. Since the input signal may be a positive or negative pulse, the circuit is arranged to introduce equal threshold to either polarity of pulse. Condenser 85 blocks direct current but has negligible reactance at all envelope frequencies. The pulse passed through condenser 85 is passed through equal resistances 82 and 83 to oppositely poled diode rectifiers 74 and 75. Resistances 77 and 78 are equal and batteries *76a* and *76b* develop equal voltages so that the voltage across adjustable resistance 79 is balanced, that is, the voltage from one end of resistance 79 to the junction of batteries *76a* and *76b* is equal in magnitude and opposite in polarity to that from the other end of resistance 79 and, further, this balance is not affected by adjustment of resistance 79. Therefore adjustment of resistance 79 varies the bias voltages applied through equal resistances 80 and 81 to diodes 75 and 74 without disturbing the equality in magnitude of these two bias voltages. For weak signals or noise the bias voltages applied to diodes 74 and 75 prevent their conduction but if the signal voltage is sufficiently large one or the other of the diodes will conduct and pass the pulse to load resistor 84. For example, if the signal pulse is positive the pulse will tend to make diode 74 conduct in spite of the bias action of batteries *76a* and *76b*; whereas a negative pulse tends to pass through diode 75.

It will be evident from the foregoing description that this invention is not limited to the specific methods and systems disclosed and described herein for illustration but that the novel methods and arrangements are susceptible of many variations within the scope and spirit of the appended claims.

What is claimed is:

1. A system comprising means for supplying waves including carrier signal waves accompanied by noise components of a frequency band embracing the carrier signal frequency band, said system comprising means for selecting from the waves so supplied waves of the carrier signal frequency band to the exclusion of waves of other frequencies, means for selecting from said noise components waves of frequencies lying outside said carrier signal frequency band and of total frequency band width equal to the width of said carrier signal frequency band, a rectifying circuit and an integrating circuit for producing the envelope of the waves selected by said first selecting means, a rectifying circuit and an integrating circuit for producing the envelope of the waves selected by said other selecting means, means for combining said envelopes with such sense and magnitudes as to obtain an improved envelope signal having a greater ratio of signal magnitude to noise magnitude than said first-mentioned envelope, a band-pass filter for selecting, from said improved envelope signal, waves of a given frequency band to effect further improvement in the signal-to-noise ratio and the degree of noise balance, means for heterodyning a portion of said selected waves of the carrier signal frequency band to produce an audio frequency signal suitable for audible reproduction, and means controlled by waves selected by said band-pass filter for controlling the intensity of said audio frequency signal.

2. A signal channel for transmitting signal waves subject to interfering waves, a volume expander in said signal channel, a control channel deriving signal waves from said signal channel and including a rectifier and filter for producing from said derived waves a control voltage for application to said expander to control the signal transmission efficiency of said expander, said expander having a given value of signal transmission efficiency in the absence of application thereto of said control voltage and being capable of increasing and decreasing its signal transmission efficiency from said given value in response to application of said control voltage to said expander in one sign and in the opposite sign, respectively, and means included in said control channel between said filter and said expander for preventing reversal of said control voltage applied to said expander.

3. A signal channel for transmitting signal waves subject to interfering waves, a volume expander in said signal channel, a control channel deriving signal waves from said signal channel and including a rectifier and filter for producing from said derived waves a control voltage for application to said expander to control the signal transmission efficiency of said expander, said expander being capable of transmitting the signal in the absence of application thereto of said control voltage and said expander increasing its signal transmission efficiency in response to application of said control voltage thereto, and a rectifier included in said control channel between said filter and said expander and poled for preventing reversal of said control voltage applied to said expander.

4. A system for indicating the sign of the phase angle between two signal waves of like frequency accompanied respectively by two noise waves alike as to the frequencies of their components, said system comprising two like phase-sensitive rectifiers, each having two conjugate input circuits and a balanced output circuit, means for deriving from each of said two signal waves and its accompanying noise wave, a signal wave and an accompanying noise wave, with said two derived signal waves having their phase displacement ninety degrees different from the phase displacement between said two first-mentioned signal waves and with said two derived noise waves having the phase displacement between the components in one and the components of like frequency in the other ninety degrees different from the phase displacement between the components in one of said two first-mentioned noise waves and the components of like frequency in the other of said two first-mentioned noise waves, frequency selective means for selecting from one of said derived signal waves and its accompanying derived noise wave two subbands of waves, one of said subbands being waves of the frequency band of said one derived signal wave and the other of said subbands being waves of an adjacent frequency band of like width, means for supplying one of the two subbands of waves to one of said conjugate input circuits of one of said rectifiers, means for supplying the other of said subbands to a corresponding input circuit of said other rectifier, frequency selective means for selecting from the other of said derived signal waves and its accompanying derived noise wave two subbands of waves, one of the latter two subbands being waves of the frequency band of said other derived signal wave and the other of the latter two subbands being waves of said adjacent frequency band, means for supplying waves of said one of said two latter subbands to the other conjugate input circuit of said one rectifier, means for supplying waves of the other of said two latter subbands to the other conjugate input circuit of said other rectifier, and means for indicating the sign of the difference between the outputs of said rectifiers.

5. A signal receiving system comprising means for receiving carrier signal waves accompanied by noise waves of a charcter having similar noise envelopes for adjacent and mutually exclusive frequency bands of like width, means including frequency selecting means exclusively effective for a given one of said bands that contains the carrier signal and wave rectifying and integrating means for deriving the envelope of the carrier signal and noise in said given band, means including frequency selecting means exclusively effective for an adjacent noise frequency band of different center frequency than said given band and wave rectifying and integrating means like said first-mentioned wave rectifying and integrating means for deriving from said adjacent band the envelope of the noise alone, means for combining said envelopes in proper sense to balance out noise and to form a combined envelope signal of improved signal-to-noise ratio, a band-pass filter for selecting from the combined envelope signal a given frequency band of waves to effect further improvement in the signal-to-noise ratio and the degree of noise balance, and indicating means connected to said band-pass filter for indicating the existence of the signal in said given frequency band.

6. A signal receiving system comprising means for receiving carrier signal waves accompanied by noise waves of a character having similar noise envelopes for adjacent and mutually exclusive frequency bands of like width, means including frequency selecting means exclusively effective for a given one of said bands that contains the carrier signal and wave rectifying and integrating means for deriving the envelope of the carrier signal and noise in said given band, means including frequency selecting means exclusively effective for an adjacent noise frequency band of different center frequency than said given band and wave rectifying and integrating means like said first-mentioned wave rectifying and integrating means for deriving from said adjacent band the envelope of the noise alone, means for combining said envelopes in proper sense to balance out noise and to form a combined envelope signal of improved signal-to-noise ratio, a band-pass filter for selecting from the combined envelope signal a given frequency band of waves to effect further improvement in the signal-to-noise ratio and the degree of noise balance, and a work circuit connected to said band-pass filter and responsive to said combined envelope signal as passed by said filter for indicating reception of said carrier signal waves.

7. The combination according to claim 6, wherein said means for receiving carrier signal waves comprises two wave receivers spatially displaced for respectively receiving signal waves of different phase accompanied by said noise, wherein said frequency selecting means comprise circuits associated respectively with each of said receivers, wherein said wave rectifying means comprise two like phase-sensitive rectifiers, said frequency selecting means being coupled to one of said rectifiers with respect to said given band and being coupled to the other of said rectifiers with respect to said adjacent band, and wherein said work circuit is adapted to indicate the sign and amplitude of said combined envelope signal thereby indicating the relative phase of said signals received by said two receivers in addition to the reception of said carrier signal waves.

References Cited in the file of this patent

UNITED STATES PATENTS

| | | |
|---|---|---|
| 1,667,540 | Dorsey | Apr. 24, 1928 |
| 1,692,877 | Vreeland | Nov. 27, 1928 |
| 1,748,797 | Russell | Feb. 25, 1930 |
| 2,166,694 | Selby | July 18, 1939 |
| 2,166,991 | Guanella | July 25, 1939 |
| 2,227,415 | Wolff | Dec. 31, 1940 |
| 2,263,120 | Mathes | Dec. 23, 1941 |
| 2,298,657 | Smith et al. | Oct. 13, 1942 |
| 2,376,730 | Steinhoff | May 22, 1945 |
| 2,400,552 | Hoover | May 21, 1946 |
| 2,408,395 | Hayes | Oct. 1, 1946 |
| 2,422,374 | Striebe | June 17, 1947 |